United States Patent
Baldwin et al.

(10) Patent No.: US 8,462,637 B1
(45) Date of Patent: Jun. 11, 2013

(54) DIAL PLAN ROUTING FOR FRAGMENTED NETWORKS

(75) Inventors: Christopher David Baldwin, Princeton, NJ (US); Neil Ellis Gallensky, Westminster, CO (US); Donald E. Gillespie, Boulder, CO (US); Michael Gruen, Ahrensburg (DE); Alan Stuart Mulberg, Denver, CO (US); Luigi Gentile Polese, Thornton, CO (US)

(73) Assignee: Sheridan Ross P.C., Basking Ridge, NJ (US)

( * ) Notice: Subject to any disclaimer, the term of this patent is extended or adjusted under 35 U.S.C. 154(b) by 1276 days.

(21) Appl. No.: 11/231,203

(22) Filed: Sep. 19, 2005

Related U.S. Application Data

(60) Provisional application No. 60/641,629, filed on Jan. 4, 2005, provisional application No. 60/689,605, filed on Jun. 10, 2005.

(51) Int. Cl.
*G06F 11/00* (2006.01)
*G06F 15/173* (2006.01)
*H04L 12/66* (2006.01)
*H04M 7/00* (2006.01)
*H04W 40/00* (2009.01)

(52) U.S. Cl.
USPC ........... 370/237; 370/352; 370/353; 370/354; 379/221.01; 379/221.02; 379/221.14; 379/229; 379/223

(58) Field of Classification Search
USPC ................. 370/351, 216–218, 352–356, 360, 370/384–386, 237; 379/221.03, 219, 221.01–221.04, 221.14–221.15, 229, 233, 379/234; 714/1–4; 709/208, 223, 229, 239; 455/428, 455
See application file for complete search history.

(56) References Cited

U.S. PATENT DOCUMENTS

| | | | |
|---|---|---|---|
| 5,206,903 A | 4/1993 | Kohler et al. | |
| 5,280,561 A | 1/1994 | Satoh et al. | |
| 5,442,696 A | 8/1995 | Lindberg et al. | |
| 5,828,747 A | 10/1998 | Fisher et al. | |
| 5,905,793 A | 5/1999 | Flockhart et al. | |

(Continued)

FOREIGN PATENT DOCUMENTS

| | | |
|---|---|---|
| EP | 0805576 A2 | 11/1997 |
| EP | 0920176 A2 | 6/1999 |

(Continued)

OTHER PUBLICATIONS

Declaration of Michael Gruen Under 37 CFR § 1.98; 3 pages.

(Continued)

*Primary Examiner* — Asad Nawaz
*Assistant Examiner* — Wutchung Chu
(74) *Attorney, Agent, or Firm* — Sheridan Ross P.C.

(57) ABSTRACT

In one configuration, the present invention is directed to an enterprise network that includes geographically dislocated first and second network regions communicating with one another through first and second networks and respectively comprising first and second gateways and first and second groupings of trunks. A media server is positioned in the first network region that includes a routing agent. When a WAN outage occurs, the routing agent, using a dial plan, maps the dialed digits to an electronic address addressable over the PSTN and routes the call over the PSTN to the destination second communication device in the second network region.

20 Claims, 4 Drawing Sheets

U.S. PATENT DOCUMENTS

| | | | |
|---|---|---|---|
| 5,970,134 A * | 10/1999 | Highland et al. | 379/265.02 |
| 5,974,114 A | 10/1999 | Blum et al. | |
| 5,982,873 A | 11/1999 | Flockhart et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,282,192 B1 | 8/2001 | Murphy et al. | |
| 6,292,463 B1 | 9/2001 | Burns et al. | |
| 6,314,114 B1 | 11/2001 | Coyle et al. | |
| 6,411,705 B2 | 6/2002 | Oran et al. | |
| 6,434,226 B1 | 8/2002 | Takahashi | |
| 6,504,922 B1 | 1/2003 | Erb | |
| 6,574,469 B1 | 6/2003 | Xiang et al. | |
| 6,661,785 B1 * | 12/2003 | Zhang et al. | 370/352 |
| 6,665,375 B1 | 12/2003 | Forlenza et al. | |
| 6,671,262 B1 | 12/2003 | Kung et al. | |
| 6,721,712 B1 | 4/2004 | Benyassine et al. | |
| 6,731,734 B1 | 5/2004 | Shaffer et al. | |
| 6,738,343 B1 | 5/2004 | Shaffer et al. | |
| 6,801,612 B2 | 10/2004 | Malcolm et al. | |
| 6,925,076 B1 | 8/2005 | Dalgic et al. | |
| 6,937,873 B2 | 8/2005 | Levy et al. | |
| 6,950,874 B2 | 9/2005 | Chang et al. | |
| 6,968,382 B2 | 11/2005 | McBrearty et al. | |
| 6,973,506 B2 | 12/2005 | Ishiyama et al. | |
| 6,999,478 B2 | 2/2006 | D'Angelo | |
| 7,042,871 B2 | 5/2006 | Gallant et al. | |
| 7,145,900 B2 | 12/2006 | Nix et al. | |
| 7,161,897 B1 | 1/2007 | Davies et al. | |
| 7,190,676 B2 * | 3/2007 | Anderson, Sr. | 370/236 |
| 7,215,643 B2 | 5/2007 | Mussman et al. | |
| 7,227,927 B1 | 6/2007 | Benedyk et al. | |
| 7,243,142 B2 | 7/2007 | Poirot et al. | |
| 7,243,365 B1 | 7/2007 | Rahman | |
| 7,336,649 B1 * | 2/2008 | Huang | 370/352 |
| 7,426,652 B2 * | 9/2008 | Liccione et al. | 714/3 |
| 7,577,090 B2 * | 8/2009 | Xu et al. | 370/219 |
| 7,613,170 B1 * | 11/2009 | Grabelsky et al. | 370/352 |
| 7,773,580 B2 * | 8/2010 | Yeom | 370/352 |
| 2003/0031137 A1 | 2/2003 | Mecklin Tomas | |
| 2003/0086559 A1 * | 5/2003 | Chen et al. | 379/399.01 |
| 2003/0091024 A1 * | 5/2003 | Stumer | 370/352 |
| 2003/0091028 A1 * | 5/2003 | Chang et al. | 370/352 |
| 2003/0165219 A1 * | 9/2003 | Bedingfield et al. | 379/88.17 |
| 2003/0202462 A1 * | 10/2003 | Smith et al. | 370/216 |
| 2004/0028199 A1 | 2/2004 | Carlson | |
| 2004/0032862 A1 * | 2/2004 | Schoeneberger et al. | 370/352 |
| 2004/0101119 A1 | 5/2004 | Malcolm et al. | |
| 2004/0143665 A1 | 7/2004 | Mace et al. | |
| 2004/0252676 A1 | 12/2004 | Bye | |
| 2005/0021849 A1 | 1/2005 | Hipfinger | |
| 2005/0068889 A1 | 3/2005 | Chavez et al. | |
| 2005/0094582 A1 | 5/2005 | Forissier et al. | |
| 2005/0249196 A1 * | 11/2005 | Ansari et al. | 370/352 |
| 2005/0281204 A1 * | 12/2005 | Karol et al. | 370/248 |
| 2005/0281216 A1 | 12/2005 | Varonen et al. | |
| 2006/0002381 A1 * | 1/2006 | Socaciu | 370/352 |
| 2006/0034297 A1 | 2/2006 | O'Neill | |
| 2006/0067274 A1 | 3/2006 | Gillespie et al. | |
| 2006/0092919 A1 | 5/2006 | Hallmark et al. | |
| 2006/0146737 A1 | 7/2006 | Sandgren et al. | |
| 2006/0146799 A1 | 7/2006 | Baldwin et al. | |
| 2006/0146802 A1 | 7/2006 | Baldwin | |
| 2006/0146859 A1 | 7/2006 | Baldwin et al. | |
| 2006/0168326 A1 | 7/2006 | Baldwin et al. | |
| 2008/0049770 A1 | 2/2008 | Gillespie | |

FOREIGN PATENT DOCUMENTS

| | | |
|---|---|---|
| EP | 0964563 | 12/1999 |
| EP | 1091550 | 4/2001 |
| EP | 1250023 A1 | 10/2002 |
| EP | 1677569 A1 | 7/2006 |
| EP | 1677570 A1 | 7/2006 |
| JP | S58-170272 | 10/1983 |
| JP | H04-245793 | 9/1992 |
| JP | H06-86338 | 3/1994 |
| JP | 08-065340 | 3/1996 |
| JP | H8-320800 | 12/1996 |
| JP | H10-164240 | 6/1998 |
| JP | 10-224408 | 8/1998 |
| JP | H10-214240 | 8/1998 |
| JP | H11-331153 | 11/1999 |
| JP | 2000-174824 | 6/2000 |
| JP | 2000-174825 | 6/2000 |
| JP | 2001-156786 | 6/2001 |
| JP | 2001-186165 | 7/2001 |
| JP | 2001-196165 | 7/2001 |
| JP | 2002-522962 | 7/2002 |
| JP | 2002-237896 | 8/2002 |
| JP | 2002-247187 | 8/2002 |
| JP | 2002-305588 | 10/2002 |
| JP | 2003-101669 | 4/2003 |
| JP | 2003-514439 | 4/2003 |
| JP | 2003-244204 | 8/2003 |
| JP | 2004-186766 | 7/2004 |
| JP | 2005-39565 | 2/2005 |
| JP | 2005-512397 | 4/2005 |
| WO | WO 00/72536 | 11/2000 |
| WO | WO 00/72560 A1 | 11/2000 |
| WO | WO 01/65808 | 9/2001 |
| WO | WO 01/69858 | 9/2001 |

OTHER PUBLICATIONS

U.S. Appl. No. 11/080,763, filed Mar. 14, 2005, Coughlan et al.

M. Bozinovski et al., "Fault-tolerant SIP-based call control system," Electronics Letters, vol. 39, No. 2 (Jan. 23, 2003), pp. 254-256, XP006019695 ISSN: 0013-5194.

ITU-T Recommendation H.248, "Series H: Audiovisual and Multimedia Systems," International Telecommunication Union (Jun. 2000), pp. 1-121.

Kristol and Montulli, "HTTP State Management Mechanism," Oct. 2000, pp. 1-22, available at http://www.cse.ohio-state.edu/cgi-bin/rfc/rfc2965.html, printed Feb. 3, 2005.

Clark, William J.; "Multipoint Multimedia Conferencing"; IEEE Communications Magazine; May 1992; pp. 44-50.

"Separation of Bearer and Signaling for Avaya™ Communication Manager," Avaya, Issue 1 (May 2003) pp. 1-42.

Background for the above-captioned application (previously provided).

Cisco Systems Overview—Cisco IOS Telephony Services: Survival Remote Site Telephony, "Now Cost-Effectively Extend Cisco CallManager IP Telephony and High Productivity Applications to Small Branch Office Sites" Copyright 2001, Cisco Systems, Inc., pp. 1-4.

Cisco Systems Solutions Guide—"Survivable Remote Site Telephony Cisco 2600/3600 Voice Technical Marketing" Copyright 1992-2001, Cisco Systems, Inc., pp. 1-19.

Cisco Systems IOS Release 12.2(8)T—Survivable Remote Site Telephony, pp. 1-74 (undated).

Cisco Solutions Guide—"Survivable Remote Site Telephony Cisco 2600/3600 Voice Technical Marketing" Copyright 1992-2001, Cisco Systems, Inc., http://www.cicso.com/warp/public/cc/pd/unco/srstl/tech/demha_sg.htm (21 pages).

Cisco Systems—Survivable Remote Site IP Telephony, Copyright 1992-2003, Cisco Systems, Inc., http://www.cisco.com/warp/public/cc/pd/unco/srstl, 1 page.

Cisco Systems White Paper—"Ensuring IP Telephony High Availability in the Branch Office, Now Cost-effectively Extend Cisco CallManager IP Telephony to Small Branch Office Sites Using Cisco Survivable Remote Site Telephony" Copyright 1992-2005, Cisco Systems, Inc., http://www.cisco.comlen/us/products/sw/voicesw/ps2169/products_white_paper09186a008 . . . (5 pages).

Cisco IP Telephony Solution Reference Network Design, Dial Plan, #9562230403, Chapter 8, pp. 1-70 (undated).

Lucent Technologies Merlin Legend Communications System, Release 6.1, Network Reference, 555-661-150 Comcode 108289703; Issue 1, Aug. 1998; 369 pages.

Carroll Communications, Inc. Automatic Route Selection (ARS) Feature, at http://www.carrollcommunicattions.com/merlinmagix/AutomaticRouteSelection.html, 2 pages.

KXTD System—ISDN—Basic and Primary Rate Interfaces, at http://www.thetelephoneexchange.co.uk/Teleweb_files/kxtd.html, 5 pages.

Definition—automatic route selection (ARS) at http://www.atisorg/tg2k/automatic_selection_route.html, 1 page.

Acronym Finder—ARS at http://www.auditmypc.com/acronym/ARS.asp, 2 pages.

WestNet Learning—glossary for UDP, at http://glossary.westnet.com/term.php?termId=2213, 1 page.

Handley et al., RFC 2327, Apr. 1998, pp. 1-43.

* cited by examiner

DIAL PLAN ROUTING FOR FRAGMENTED NETWORKS

CROSS REFERENCE TO RELATED APPLICATION

This application claims the benefits under 35 U.S.C. §119 of U.S. Provisional Patent Application Ser. No. 60/641,629, filed Jan. 4, 2005, entitled "ALTERNATE ROUTING OF MEDIA CONNECTIONS WITHIN A SINGLE COMMUNICATIONS SYSTEM ACROSS PUBLIC OR PRIVATE NETWORK FACILITIES" to Baldwin, et al., and Ser. No. 60/689,605, filed Jun. 10, 2005, entitled "SCH DIAL PLAN TRANSPARENCY", to Baldwin, et al., each of which is incorporated herein by this reference.

Cross reference is made to U.S. patent application Ser. Nos. 11/230,355, filed Sep. 19, 2005, entitled "DIAL PLAN TRANSPARENCY FOR FRAGMENTED NETWORKS"; 11/107,659, filed Apr. 14, 2005, and entitled "IN-BAND CALL ASSOCIATION SIGNALING FOR A SINGLE NUMBER DESTINATION"; and 11/107,524, filed Apr. 14, 2005, and entitled "ALTERNATE ROUTING OF MEDIA CONNECTIONS WITHIN A SINGLE COMMUNICATIONS SYSTEM ACROSS PUBLIC OR PRIVATE NETWORK FACILITIES", each of which is incorporated herein by this reference.

FIELD

The invention relates generally to converged communications networks and particularly to alternate communication paths for voice communications.

BACKGROUND

IP networks generally provide an excellent infrastructure for geographically distributing components of a telecommunication system. The underlying IP network is optimal for transmission for control signaling, and, when bandwidth is available, can provide an acceptable Quality of Service (or QoS) or Grade of Service (or GOS) for voice communications. When insufficient network resources are available for voice communications or one or more IP network components are down, voice communications can be adversely impacted.

For example, assume an enterprise network having first and second network regions, with each network region being served by a different media gateway and survivable media server. The primary media server controls the gateways in a first operational mode. When the WAN is available, a subscriber in the first network region can dial any other subscriber in the first and second network regions simply by dialing that subscriber's extension. In the event of a network failure that causes the primary server to lose control of one or both of the survivable media servers, the first media gateway in the first network region will register with the first survivable media server, and the second media gateway in the second network region will register with the second survivable media server. This is the second operational mode. As a result, a subscriber in one network region is unable to dial directly the extension of a subscriber in another network region. Even though each survivable media server is aware of all of the endpoints in the enterprise network, each media server controls only the endpoints in its respective network region.

A number of techniques have been attempted to address these issues.

In one technique, when a system has multiple communication gateways controlled by a single controller and the private switching facilities inter-connecting these gateways failed, users can "dial-out" on a public network trunk using the public address (or the Direct Inward Dial or DID number) of the destination party. A calling subscriber can dial a PSTN access code, followed by a complete public network number to reach the called subscriber. By way of illustration, instead of dialing a five-digit extension (83594) to reach a telephone in another branch office, a subscriber must dial 9-303-538-3594 during a network failure. This approach requires manual intervention by the user first to recognize that a problem exists, second to determine how to circumvent it, and third to dial the DID number. If the destination party to be reached does not have a public number, he or she cannot be reached directly by the alternate network. In particular, subscribers without a DID number cannot be reached by dialing PSTN numbers without an intervening auto-attendant. Moreover, though some subscribers may be permitted to make and receive extension-dialed calls, they may have restrictions that prevent them from placing or receiving PSTN calls. Finally, no feature transparency is available since calls appear as simple incoming and/or outgoing PSTN calls.

Another technique for managing IP bandwidth usage includes call admission control in which the number of calls across the Wide Area Network or WAN or the bandwidth available for voice calls is limited. Call admission control can result in the call being denied and being forwarded to the callee's voice mail server (if accessible), thereby causing caller frustration.

In yet another technique known as PSTN Fallback™ of Avaya Inc., a call is forced to the PSTN when an IP trunk connection experiences an unacceptable QoS or GOS. With reference to FIG. 1, a multi-enterprise architecture is depicted, each enterprise 100 and 104 having a separate, independent, and active or primary media servers 112 and 116 with resident call controller functionality. Each enterprise also includes a plurality of digital stations 120 and 124, a plurality of IP or Internet Protocol stations 128 and 132, a gateway 136 and 140 and a Local Area Network or LAN 144 and 148. The media servers 112 and 116 are independent in that one media server in one enterprise is generally unaware of the subscriber configuration information, such as extensions, of the other enterprise's subscribers. The gateways 136 and 140 are interconnected by the Public Switched Telephone Network or PSTN 148 and Wide Area Network or WAN 152. When a call is to be placed over the WAN 152, the originating call controller determines the currently measured network delay and packet loss. When either measured variable reaches a predetermined threshold, the call controller automatically takes the idle IP trunk ports out-of-service, i.e., it busies out the ports. The ports remain out-of-service until the measurements return to the low threshold. No new calls are allowed over the IP trunk. Normal or conventional call routing over the PSTN 148 is used for access to the next preference in the digit analysis.

In a further technique known as Separation of Bearer and Signaling™ (SBS) of Avaya Inc., the signaling channel for a call is routed over the WAN 152 while the bearer channel is routed over the PSTN 148. The signaling channel in SBS includes SBS call-control signaling and QSIG private-networking protocol information. SBS associates the signaling and bearer channels at the SBS originating and terminating nodes so that they appear to the end users to be a normal, non-separated call. The use of the WAN for signaling traffic and the PSTN for voice bearer traffic addresses a customer need for using small amounts of bandwidth in the IP WAN for signaling traffic, with the voice bearer portion of the call being sent over inexpensive PSTN facilities. Like PSTN Fallback, SBS™ is used in multi-enterprise calls with each enterprise having separate, independent, and active media servers.

PSTN Fallback™ and SBS™ address architectures where there exist multiple, separate system implementations interconnected by a traditional inter-switch trunking protocol; in other words, they permit inter-connection only of peer-to-peer systems. With the move to larger, single-server IP WAN-connected media gateway distributed systems, there is no longer a need for IP trunks and SBS. Using trunk group administration to limit bandwidth between media servers is not required nor is PSTN Fallback™ when the number of calls exceeds the administered IP trunk member limit. There is no need to embed an intelligent signaling interface between servers over IP WAN facilities given that the system has only a single active or primary server and that all calls across the system appear to be station-to-station calls.

Another technique known as the Survivable Remote Site Telephony™ (SRS Telephony) by Cisco Systems, Inc., involves a primary server (such as CallManager™ by Cisco Systems, Inc.) controlling a plurality of interconnected subnetworks. Each subnetwork includes an IP telephony router and media gateway and is connected to other subnetworks by a WAN and the PSTN. In the event of a WAN link failure resulting in a loss of control by the primary server, SRS Telephony automatically detects the network failure and initiates a process to intelligently auto-configure the router to provide call processing redundancy for the IP phones in that network subnetwork. Link failure is detected by the IP telephones when they are no longer receiving keepalive packets from the primary server. In response, each of the IP telephones registers with the router, which queries the telephone about its configuration and then auto-configures itself. The SRS Telephony software, which is resident in the IP telephony router, is automatically activated and builds a local database of all IP telephones attached to it. When the WAN link is restored, the IP telephones detect keepalive packets from the primary server and revert to it for primary call setup and processing. This configuration, however, is only a partial solution. It is applicable only to IP phones and not to other types of communication devices, such as digital phones. Although IP telephones in each impacted subnetwork are able to call one another using extension dialing (which is typically five or fewer digits) by virtue of the call processing functionality of the local IP telephony router, they are unable to use extension dialing to call IP telephones in other subnetworks of the enterprise network. To make such calls, IP telephone users must still dial the full PSTN number (which is typically seven or more digits). Moreover, automatic feature transparency is not provided in the SRS Telephony product.

There is a need, particularly in a single-server system, for a call control system that provides an alternate communication path in the event of problems with the WAN.

SUMMARY

These and other needs are addressed by the various embodiments and configurations of the present invention. The present invention is directed generally to the establishment of public or private network (that is normally not owned or managed by the enterprise communications controller) inter-gateway connections, particularly via trunks, for a community of users/subscribers. As used herein, "gateway" refers not only to gateways but also to devices providing similar functionality, such as port networks.

In one embodiment, an enterprise network has geographically dislocated first and second network regions. The first and second network regions are in communication with one another through first and second intermediate networks and respectively include first and second gateways and a number of communication devices. In a first operational mode, the first and second network regions are controlled by a common media server and most, if not all, of the bearer channels for voice calls are routed over the first intermediate network. In a second operational mode, the first and second network regions are not controlled by a common media server. In this enterprise network, the embodiment of the present invention includes the steps of:

(a) the first network region receiving, from a first communication device of a first subscriber located in the first network region, a request to initiate a voice call to a second communication device of a second subscriber located in the second network region, the request comprising an abbreviated dial string including a directory number associated with the second communication device;

(b) the first network region determining that the enterprise network is in the second operational mode;

(c) in a dial plan, mapping the abbreviated dial string to a corresponding electronic address for the second communication device, the corresponding electronic address having more digits than the abbreviated dialing string and being in a form addressable (e.g., contactable) over the second intermediate network; and (d) using the corresponding electronic address to route the voice call over the second intermediate network to the second communication device. As will be appreciated, the abbreviated dial string has fewer digits than the DID of the second communication device and includes an extension or directory number assigned to the second communication device.

The first and second networks may be connection-oriented or connectionless and wireline or wireless. The first and second networks are commonly discrete from and independent of one another in that they employ different protocols and/or switching mechanisms for the same type of communication, e.g., for live voice communications. In one preferred configuration, the first network is circuit-switched and the second network is packet-switched.

The dial plan can be uniform or variable. It preferably operates in conjunction with Automated Alternate Routing and Automatic Route Selection to provide an alternate pathway for the call over the second intermediate network.

In one configuration, alternate routing over the second intermediate network is invoked when the called communication device is packet-switched (e.g., an IP station) and when the called communication device is not registered to a primary (central) media server in the enterprise network.

In another configuration, alternate routing over the second intermediate network is invoked when the called communication device is digital and not packet-switched (e.g., a Digital Communications Protocol or DCP station) and when the second gateway (to which the called communication device is connected) is not registered to the primary media server.

The present invention can have a number of advantages depending on the application. For example, the invention can seamlessly and automatically detect failure and, in response, route the outbound communication or contact over a different network, typically the PSTN. In this way, the user is often unaware of the network failure. The invention can allow subscribers to perform abbreviated extension dialing during WAN failure and still reach subscribers in other network fragments. Such calling functionality can be supported without the security risks of remote access or the additional feature cost of vectoring with prompting. The invention can permit selected features, such as caller identification, reason codes, distinctive ringing, and call coverage information, to be in-band signaled between the calling and called network regions. Such signaling can provide subscribers with desired functionality and services. Voice mail coverage can be provided without extra coverage path administration. Feature transparency can thus be made available to subscribers in the event of a network outage. For these and other reasons, the invention can provide increased levels of network reliability and user satisfaction and convenience.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
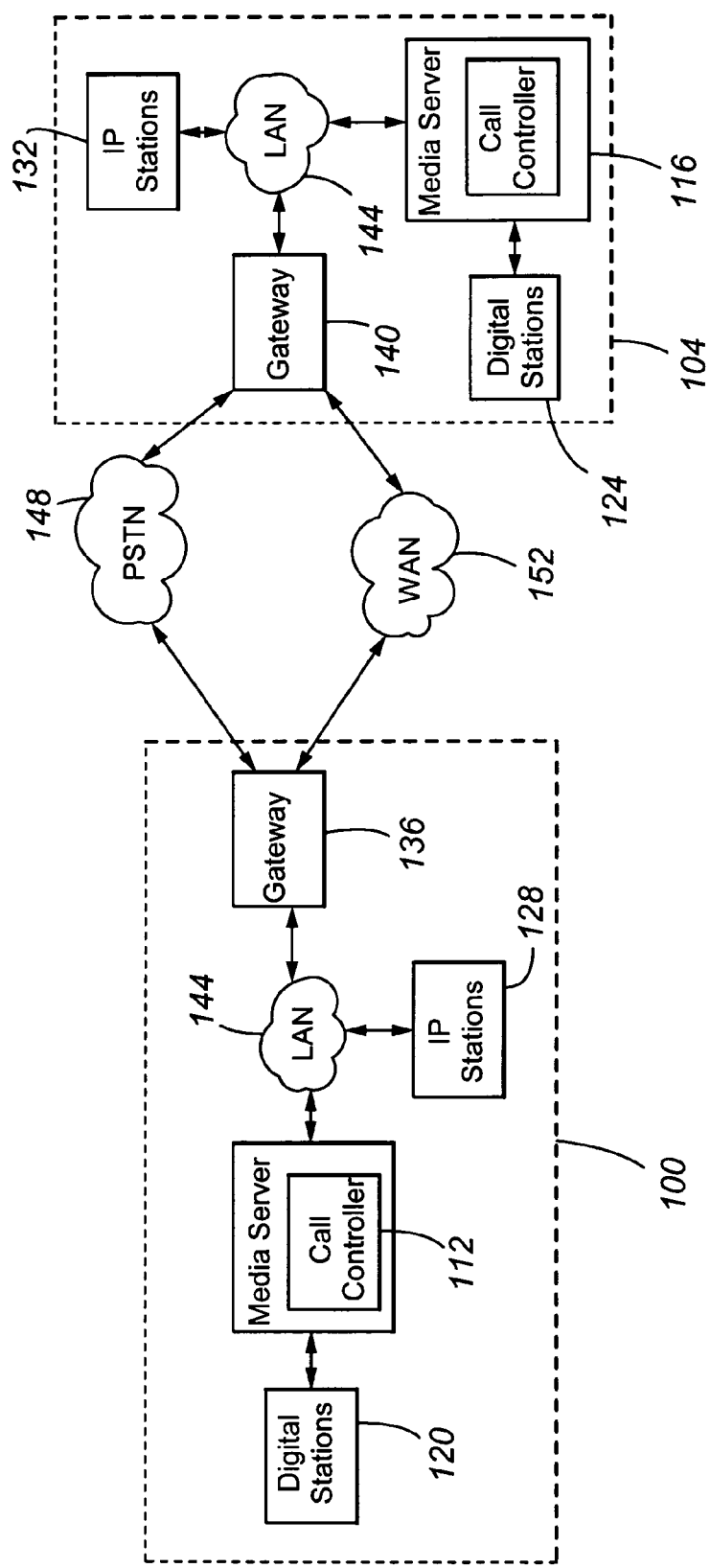
FIG. 1 is a prior art call control architecture.
Figure 2:
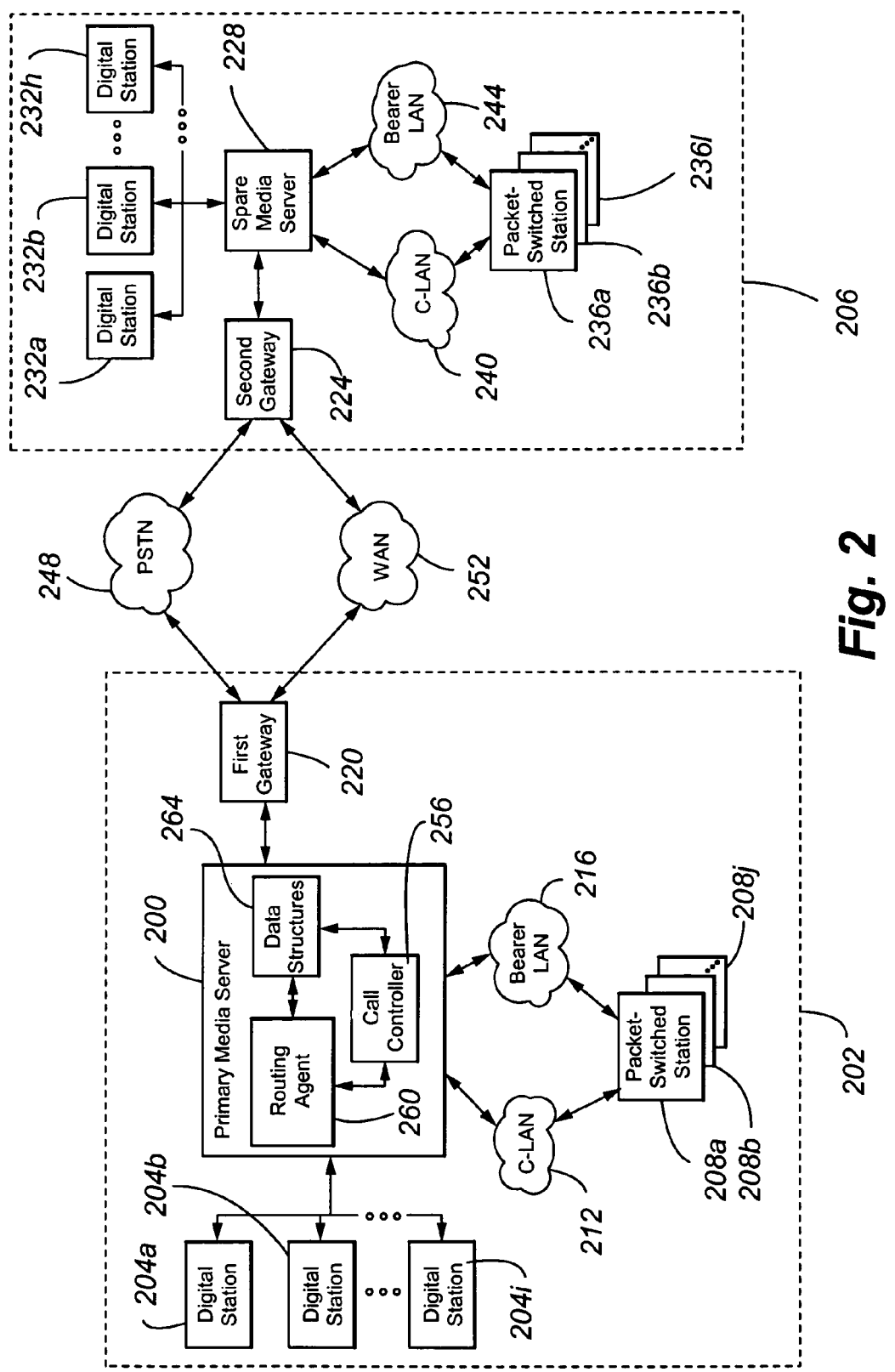
FIG. 2 is a block diagram according to an embodiment of the present invention.

FIG. 2 depicts an architecture according to an embodiment of the present invention. The architecture is in a single enterprise network having geographically dislocated first and second regions 202 and 206. The first region 202 includes a primary or active media server 200 connected to a plurality of subscriber digital stations 204a-i and a plurality of subscriber IP stations 208a-j via Control LAN or C-LAN 212 and bearer LAN 216, and first gateway 220. The second region 206 includes a spare or secondary media server 228 connected to a plurality of subscriber digital stations 232a-k and a plurality of subscriber packet-switched stations 236a-1 via C-LAN 240 and bearer LAN 244 and a second gateway 224. The first and second gateways 220 and 224 are interconnected via the PSTN 248 and a WAN 252.

Each of the subscriber digital stations and packet-switched stations can be one or more wireline or wireless packet-switched and/or circuit-switched communication devices, respectively. For example, the digital stations can be digital telephones such as Digital Communications Protocol or DCP phones, Integrated Digital Services Network (ISDN) endpoints (BRI and PRI terminal equipment including telephones and video endpoints), voice messaging and response units, traditional computer telephony adjuncts, and wired and wireless circuit-switched telephones, and the packet-switched stations can be any packet-switched communication device such as Avaya Inc.'s IP phones such as 4600 Series IP Phones™, IP softphones such as Avaya Inc.'s, IP Softphone™, Personal Digital Assistants or PDAs, Personal Computers or PCs, laptops, and H.320 video phones and conferencing units.

Each of the first and second gateways is an electronic signal repeater and protocol converter that commonly provides a telephone exchange service, supporting the connection of the various types of stations and outside packet-switched and/or circuit-switched telephone lines (such as analog trunks, ISDN lines, E1/T1 voice trunks, and WAN route IP trunks). Telephone lines are typically connected to the gateway via ports and media modules on the chassis, with different media modules providing access ports for different types of stations and lines. Voice and signaling data between packet-switched and circuit-switched protocols is normally effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, call admission control, and a media processor, and one or more IP server interfaces. Examples of gateways include Avaya Inc.'s SCC1™, MCC1™, CMC™, G350™, G600™, G650™, and G700™.

The C-LANs 212 and 240, bearer LANs 216 and 244, and WAN 252 are packet-switched and may employ any suitable protocol, such as the TCP/IP suite of protocols, the Ethernet protocol, the Session Initiation Protocol or SIP, and/or the H.323 protocol.

The primary and spare media servers controlling the gateways can be any converged architecture for directing circuit-switched and/or packet-switched customer contacts to one or more stations. As will be appreciated, the primary media server normally controls the first and second gateways. In the event of a loss of communication with the second gateway, such as through a catastrophic WAN failure, the spare media server becomes active and takes over control of the second gateway 224. A loss of control or connectivity is typically determined by a heartbeat or polling mechanism between the primary server 200 on the one hand and the spare media server 228, second gateway 224, and/or stations 232 and 236 on the other. When the heartbeat or polling mechanism fails, a network failure is assumed to have occurred. Commonly, the media servers are stored-program-controlled systems that conventionally include interfaces to external communication links, a communications switching fabric, service circuits (e.g., tone detectors and generators, announcement circuits, etc.), memory for storing control programs and data, and a processor (i.e., a computer) for executing the stored control programs to control the interfaces and the fabric and to provide automatic contact-distribution functionality. Illustratively, the media servers can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

Each of the primary and spare media servers 200 and 228 include call controller functionality 256, an routing agent 260, and call-related data structures 264. Call controller 256 performs call control operations, such as call admission control, progressive call control, and originating call control, and the routing agent alternately routes calls (referred to as Inter-Network SubRegion or INSR calls over circuit-switched trunks (e.g., public or private ISDN PRI/BRI trunks and R2MFC trunks)) in the PSTN 248 when the WAN 252 is determined to be incapable of carrying the bearer connection or the destination station is unreachable. Such a network state may be deemed to exist when the destination (digital) station 232 is connected directly to the second gateway 224 and the second media gateway 224 is not registered with the primary media server 200 or when a packet-switched station 236 is not registered to the primary media server 200 (whether the unregistration is due to network failure or any normal circumstance). A network state can result when control of the second gateway 224 is lost by the primary media server 200 (e.g., when the packet-switched WAN 252 has a catastrophic failure thereby resulting in partitioning of the network with each region 202 and 206 having an active media server or when the primary server 200 itself fails). The agent can preserve the internal makeup of the INSR call between a pair of gateways in separate port network regions even though the voice bearer portion of the INSR call is rerouted over alternative PSTN facilities.

As will be appreciated, an INSR call may be routed over the PSTN for reasons other than a call between subscribers. For example, a station in one network region can bridge onto a call appearance of a station in another network region, an incoming trunk in one network region can be routed to a hunt group with agents in another network region, and an announcement or music source from one network region must be played to a party in another network region.

To preserve inter-subscriber abbreviated extension (or on-net) dialing (e.g., using four or five digits), the routing agent 260 preferably uses the Uniform Dial Plan, Automated Alternate Routing, and Automatic Route Selection features to define a routing plan between selected locations in the enterprise network. As will be appreciated, calls that originate and terminate on the same enterprise network are considered to be on-network (or on-net), and calls that originate in one enterprise network and terminate in a different enterprise network are considered to be off-network (or off-net). A uniform on-net dial plan maps dialed extension ranges against DID ranges and maps each extension to a unique location (or gateway). The extension number(s) assigned to each subscriber is unique within a site and often within the enterprise network. A uniform dial plan is designed so that all extensions within the enterprise are reached in a uniform way (e.g., a fixed quantity of digits are used to reach a given extension from any on-net originating station). A variable length on-net dial plan is for enterprises having many geographically distributed sites or branches that retains the use of extension-only abbreviated dialing for calls to on-net extensions within a site and uses an access code (which is typically one digit) followed by a site code (which may be one or more digits depending on the number of discrete sites and/or may have a one-to-one correspondence to a gateway in the enterprise network) and the destination station's on-net extension in the abbreviated dial string for calls between sites. Other steering digits in addition to the E.164 address of a selected station may be employed in the abbreviated dial string to identify the location of the station corresponding to the extension. The dial plan can use digit analysis (which are strings of digits and wildcards to route calls to external destinations), route lists (which is a prioritized list of route groups functioning as alternate paths to a given destination), and route groups (which control and point to specific devices, which are typically gateways). When a number is dialed, any suitable logic, such as closest-match logic, can be used to select which pattern to match from among all of the patterns in the routing table. Automated Alternate Routing (AAR) establishes an alternate path for the call when a specified set of conditions are found to be in existence. The specified set of conditions are set forth above. AAR is preferably configured so that subscribers dial only the on-net directory number or extension of the called station and no additional subscriber input is required to reach the destination station through the alternate network (such as the PSTN). Finally, Automatic Route Selection (ARS) automatically and dynamically routes outgoing calls over a selected route or path, sometimes after dialing an ARS access code.

The routing plan specifies the public network trunking and digit manipulation required to route the call through the PSTN 248 to reach the second gateway 224 in the second network region 206. Digit manipulation can be effected using translation rules and patterns in the first network region's calling search space and matching the dialed string to a route list, which includes the PSTN route group. As will be appreciated, translation rules convert a telephone number into a different number before the call is matched to an incoming dial peer or before the call is forwarded by the outgoing dial peer. Each network region is normally divided into one or more separate partitions. A partition is a set of directory numbers (extensions) with similar accessibility, and a calling search space defines which partitions are accessible to a particular device. A device can only call those directory numbers located in the corresponding partitions that are part of its calling search space. To add additional digits to the dialed extension, directory numbers are placed in AAR groups. For each pair of AAR groups, prefix digits are configured to be added to the directory numbers for calls between the two groups, including prefix digits for calls originating and terminating within the same AAR group. For example, the prefix digits can include an off-net (PSTN) access code such as "9", a "1" for long distance access, an area code (also known as a Numbering Plan Area or NPA), a public switch identifier, an international long distance access code such as "011", and a country code. Directory numbers are normally placed in the same AAR group if they have a common off-net access code, a common PSTN dialing structure for inter-area calls, and/or a common external phone number mask format. The AAR uses the dialed directory number to establish the call destination and combines them with the called subscriber's external phone number mask, which combination yields a fully qualified number that can be routed by (or is addressable over) the PSTN. For AAR to function properly, the AAR logic must provided with the PSTN number of the destination device, the required extension prefixes, and the proper dial plan and route. The off-net access code (e.g., "9") is normally removed before the call is presented to the PSTN. As will be appreciated, the present invention can be used with partitioned or flat addressing. Preferably, PSTN calls are enabled via site-specific partitions and digit analysis so that INSR calls can be routed via the local (first) gateway.

Digit manipulation operations can be done in any desirable order. Digit manipulation operations typically include discarding digits, called party transformations, and prefixing digits.

Figure 4:
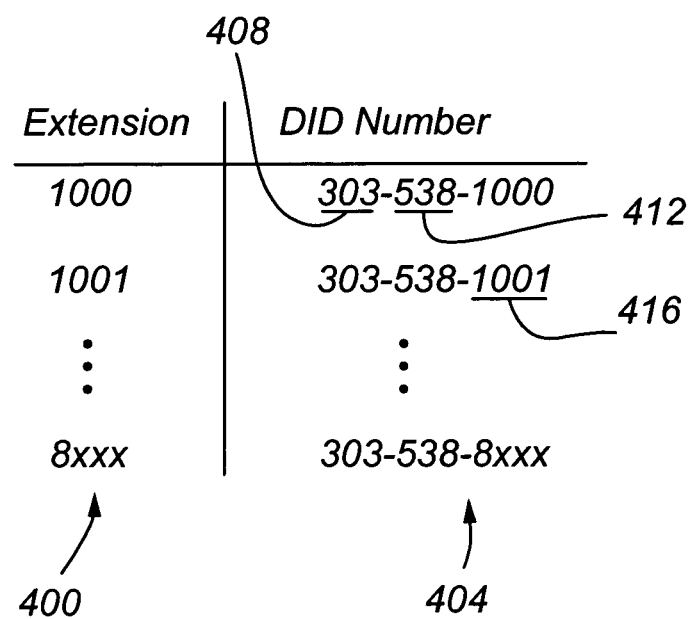
FIG. 4 is a routing table according to an embodiment of the present invention.

FIG. 4 depicts a simplified dial plan configuration used to reroute an outgoing call over the PSTN. Each extension 400 in the enterprise network is unique and corresponds to a user (which is typically a one-to-one relationship). Each extension 400 has a corresponding DID number 404, which is a combination of an area code 408, public switch identifier 412, and the corresponding extension 416. As will be appreciated, the DID number may include additional digits or access codes or exclude some of the depicted digits or access codes to provide the called subscriber's external (PSTN) phone number mask. For example and as noted above, the DID number may include a PSTN access code, a long distance or international long distance access code, a country code, and the like. The DID number may exclude the area code for discrete sites located within the same area code. The mapping table is replicated in the storage of each primary and spare media server in the enterprise network. In this way, a subscriber in any fragmented network region may use abbreviated dialing to contact a subscriber in another network region.

Preferably, a routing plan exists between all locations in the enterprise network. Thus, the PSTN preferably supports routing to the proper location in the event of network disruption, and sufficient trunking is preferably in each site or branch to handle normal incoming/outgoing calls as well as station-to-station calls in the event of WAN 252 disruption. Facility Restriction Levels (FRLs) may be used to limit access to trunking facilities. When a spare media server assumes control of a network region, trunks that are not accessible by the spare media server are considered out-of-service and are automatically skipped in the routing plan so that only trunks local to the spare media server's associated gateway(s) are used to provide an alternate route over the PSTN.

Figure 3:
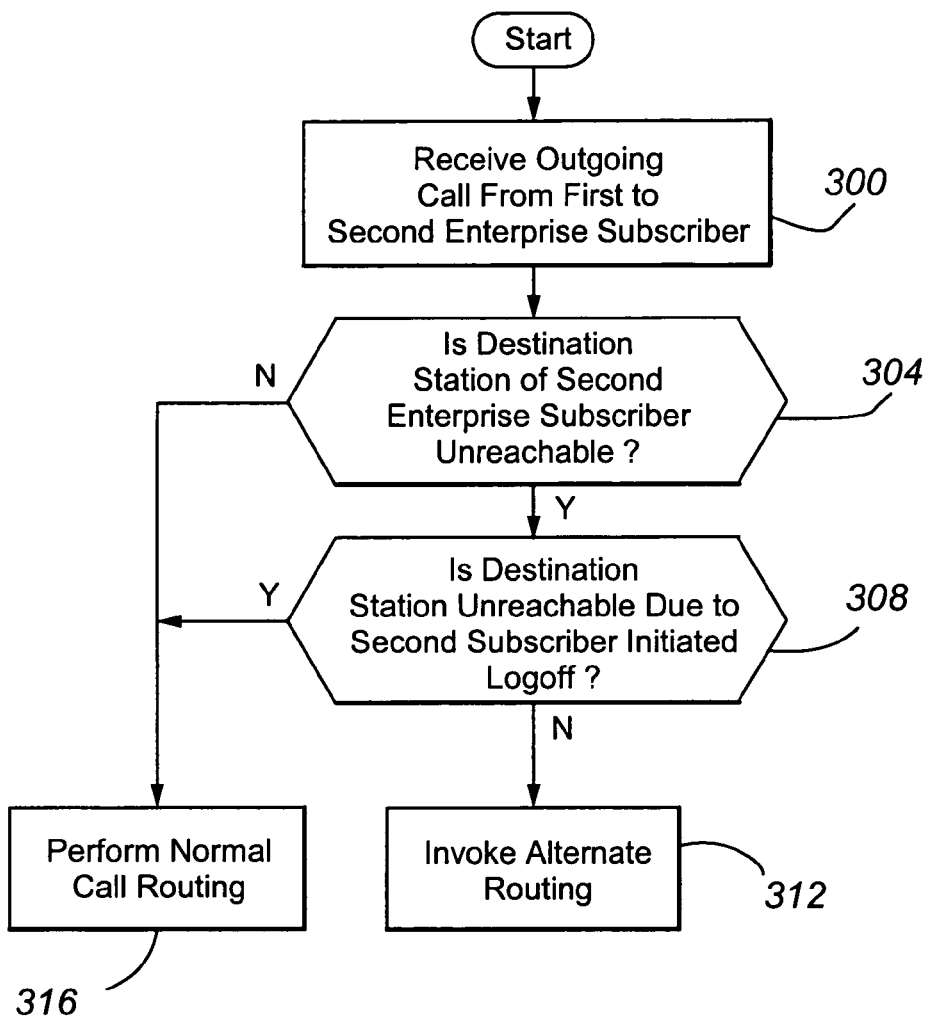
FIG. 3 is a flowchart depicting an operational embodiment of the routing agent.

Turning now to FIG. 3, the operation of the routing agent 260 will now be described. In step 300, the first gateway 220 and/or primary server 200 receive an outgoing call from a first subscriber using a digital or packet-switched station 204, 208 in the first network region 202 to a second subscriber's digital station or packet-switched station 232, 236 in the second network region 206. The received string of digits is typically an abbreviated dialed form of the destination station's (assigned) electronic address.

In decision diamond 304, the routing agent 260 determines whether or not the destination station in the second network region is unreachable. As noted, digital destination stations are deemed to be unreachable when the corresponding (second) media gateway is not currently registered with the originating (primary) media server. Packet-switched stations are deemed to be unreachable when the station is not currently registered with the controlling (central or primary) media server. Alternatively or additionally, the destination station may be deemed to be unreachable when a spare media server (or a media server other than the primary media server) is currently controlling its operations.

When the destination station is not currently reachable, the agent 260 in decision diamond 308 determines whether the destination station is a packet-switched station and is currently unreachable due to a logoff initiated by the second subscriber (or the subscriber of the destination station). Without this decision diamond, whenever a packet-switched station is logged off the PSTN rerouting feature will nonetheless be invoked, routing the call over the PSTN to the second network region 206 (even when the first and second network regions are not fragmented or are still under the control of the primary media server 200), causing the call to be routed automatically to the second network region and preventing the call from being routed to a coverage point (or hunt group). This outcome is prevented by determining if the reason that the station is currently unreachable is due to a user-initiated logoff (or if there is some other reason for not being able to reach the packet-switched station). As will be appreciated, the agent 260 will be unable to confirm whether the second subscriber is logged off of the destination station when the second network region is no longer under the control of the primary media server. A failure to confirm that the second subscriber is logged off is therefore deemed to be a network outage.

When the station is not packet-switched or when the destination station is packet-switched and is not currently reachable for a reason other than user-initiated logoff, the agent 260 in step 312 invokes the alternate routing function to route the call over the PSTN 248. Rather than doing extension routing, the alternate routing function preferably performs Uniform Dial Plan routing. In response, an appropriate routing pattern over the PSTN is returned to direct the call to the destination station. From that point, normal call processing routes the call to the destination station using the returned routing pattern.

In decision diamond 304 when the destination station is currently reachable and in decision diamond 308 when the destination station is packet-switched and is not currently reachable due to user-initiated logoff, the agent 260 effects normal call routing in step 316. In other words, the agent 260 causes normal extension routing over the WAN 252 to be performed.

After the call is routed to the second network region, additional call processing can be performed using in-band feature signaling. In-band signaled information can include, for example, the first subscriber's name and/or the calling station's number, distinctive ringing, reason code (e.g., indicating the reason that the call is coming in such as call is a priority call, a forwarded call, a call coverage call, and the like), call coverage, inward and/or outward call restrictions, class of restrictions, busy indicator or tone, busy verification (when a station seeks to busy-verify another station), call forwarding, call parking, call pickup, conferencing, crisis alert, emergency call to a provider (e.g., Public Safety Access Point), group paging, calls to hunt groups, intercom calls, last number dialed button, leave word calling, listed directory number, loudspeaker paging, malicious call trace, meet-me conference, message retrieval, off-premise station, paging, personal station access, priority calling, security violation notification, send all calls, remote send all calls, service observing, single digit dialing, station lock, station security code, voice coverage message retrieval, voice principal message retrieval, terminating extension group, transfer, voice messaging, and whisper paging. Preferably, the in-band signaling supports at least the calling number, the reason code associated with the call, and distinctive ringing.

In one configuration, the first gateway 200 connects the trunk to the station of the calling subscriber (user A) and updates the calling station's display (e.g., populates the display with the name of the called subscriber and the called subscriber's DID (or extension) number). When the spare media server 228 receives the incoming in-band signals including the second subscriber's name and number, the second gateway 224 connects the trunk to the station of the called subscriber (user B), alerts the called station 232 of the called subscriber, and updates the station's display (e.g., populates the display with the name of the calling subscriber and the calling subscriber's DID number). When the called subscriber answers, a voice connection is cut through the trunk from the calling subscriber's station 204 to the called subscriber's station 232. The spare media server 228 can notify the primary media server 200 that the called subscriber has answered the call by in-band signaling selected digits to the first gateway 220. As will be appreciated, in a normal trunk call ringback and ring tones are played on the incoming side to the trunk and are turned off when the called party answers. With a station call, ringback and ring tones are played on the originating side. In-band signaling may be used after the call is routed to the destination station by the primary media server 200 (or the originating media server) playing ringback to the calling subscriber's station 204 and the spare media server 228 playing ring tones on the called subscriber's station to permit the further exchange of in-band signals between the first and second gateways after ringback tones have commenced. In this manner, the calling subscriber will not hear the further in-band signaling tones. Normal call coverage techniques can also be performed. For example when the called subscriber's voice mail server is located in the called network region, the media server in the called network region can direct the INSR call to the voice mail server when the called subscriber fails to answer.

To prevent users from adversely reacting to a set of displayed information different than the set of information normally displayed in a WAN call, a reason code can be displayed on the calling and called user's stations indicating that the call is an INSR call. The reason code may further distinguish between bandwidth management and network fragmentation type calls.

In one configuration, call-related information is sent not only by the calling network region to the called network region but also from the called network region to the calling network region. For example when the voice mail server is located in the calling party's network region, the controlling media server in the calling party's network region can determine that the called subscriber has not answered his phone within a selected number of rings or within a selected time interval and can direct the calling subscriber's call to the local voice mail server. The controlling server in the called party's network region can in-band or out-of-band convey to the controlling server in the calling party's network a flag or other indicator that the called subscriber has failed to answer. The in-band signaling is done over the previously selected and established INSR trunk as a voice path has not been cut through the trunk. The out-of-band signaling can be done using a second INSR trunk as set forth in connection with the bandwidth management call.

Because the INSR network fragmentation-type call uses trunks and can use end-to-end signaling which can delay call set up, call setup times are preferably made faster by using faster trunks. ISDN trunks are the speediest because digital call setup messaging is fast and because the end-to-end signaling timers for ISDN trunks are very short.

As will be appreciated, when the primary server regains control of the components in the second network region INSR network fragmentation type calls are no longer used. The resumption of control by the primary server can be readily and automatically detected by a successful resumption of the heartbeat or polling mechanism; that is, the resumption of control is detected by the gateways in the various network fragments responding to heartbeat or polling signals and registering with the primary media server.

A number of variations and modifications of the invention can be used. It would be possible to provide for some features of the invention without providing others.

For example in one alternative embodiment, the logic described above may be implemented as software, a logic circuit, or a combination thereof.

In another embodiment, the present invention supports, as enterprise communication devices, analog telephones and other devices, such as wired and wireless telephones, facsimile machines, and other analog devices, whether positioned behind a circuit-switched or packet-switched network.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter:

What is claimed is:

1. A method comprising:
   providing an enterprise network having geographically dislocated first and second network regions, wherein the first and second network regions are in communication with one another through first and second intermediate networks and, respectively, comprise first and second gateways and a plurality of communication devices;
   in a first operational mode, controlling, by a common media server, the first and second network regions, wherein a majority of bearer channels for voice calls are routed over the first intermediate network;
   the first network region receiving, from a first communication device of a first subscriber located in the first network region, a request to initiate a voice call to a second communication device of a second subscriber located in the second network region, the request comprising an abbreviated dial string including a directory number associated with the second communication device;
   the first network region determining that the enterprise network is in a second operational mode, wherein the second operational mode corresponds to a state where a network failure has occurred and the first subscriber in the first network region is unable to directly dial the second subscriber in the second network region using the abbreviated dial string and the second network region is under control of a spare media server instead of the common media server;

in a dial plan, mapping, by the first network region, the abbreviated dial string to a corresponding electronic address for the second communication device, the corresponding electronic address having more digits than the abbreviated dial string and being in a form addressable over the second intermediate network; and the first network region including a primary media server that, using the corresponding electronic address, routes the voice call over the second intermediate network to the second communication device, wherein the first intermediate network is packet switched, and wherein the second intermediate network is circuit-switched; and after the call is routed over the second intermediate network to the second communication device, at least one of the first and second network regions transmitting in-band feature information, wherein the in band feature information is a reason code.

2. The method of claim 1, wherein the first operational mode is in existence when the common media server is able to communicate with each of the first and second network regions over the first intermediate network, wherein the second operational mode is in existence when the common media server is unable to communicate with each of the first and second network regions over the first intermediate network and wherein the corresponding electronic address includes the directory number.

3. The method of claim 2, wherein the common media server is the primary media server, wherein the second network region comprises the spare media server, wherein, in the second operational mode, the second network region is under the control of the spare media server.

4. The method of claim 1, wherein the second communication device is a digital station connected to the second gateway, wherein the second communication device is not packet-switched, and wherein the second operational mode is deemed to be in existence when the second gateway is not registered with the common media server.

5. The method of claim 1, wherein the second communication device is packet-switched, and wherein the second operational mode is deemed to be in existence when the second communication device not registered with the common media server.

6. The method of claim 1, wherein a first set of trunks is not local to the second gateway, wherein a second set of trunks is local to the second gateway, and wherein, when the second operational mode is in effect, the first set of trunks is considered out-of-service for purposes of directing the voice call to the second network region and the second set of trunks is not considered out-of-service for purposes of directing the voice call to the second network region.

7. The method of claim 3, wherein the dial plan is stored in the primary media and spare media servers.

8. The method of claim 1, wherein the second communication device is packet-switched and further comprising:

determining whether the second subscriber is logged off the second communication device;

when it is determined that the second subscriber is logged off of the second communication device, deeming the first operational mode to be in existence; and when it is not determined that the second subscriber is logged off of the second communication device, deeming the second operational mode to be in existence.

9. The method of claim 1, further comprising:

in response to the least one of the first and second network regions transmitting the in-band feature information the other of the at least one of the first and second network regions implementing the reason code.

10. The method of claim 1, further comprising:

the first network region playing ringback tones over the first communication device; and during the playing of ringback tones, at least one of the first and second network regions in-band signaling further contact-related information to the other of the first and second network regions.

11. The method of claim 10, further comprising:

determining that the second subscriber has failed to answer the second communication device in response to the incoming communication from the first subscriber;

determining that a voice mail server is located in the first network region; and the second network region in-band signaling the first network region that the second subscriber has not answered the incoming communication; and the first network region directing the communication from the first subscriber to the voice mail server to leave a voice message for the second subscriber.

12. An enterprise network comprising:

first and second intermediate networks and geographically dislocated first and second network regions, wherein the first and second network regions are in communication with one another through the first and second intermediate networks and, respectively, comprise first and second gateways and a plurality of communication devices, wherein, in a first operational mode, the first and second network regions are controlled by a common media server and bearer channels for voice calls are routed over the first intermediate network and wherein, in a second operational mode, the first and second network regions are not controlled by a common media server;

a routing agent located in the first network region and operable to:

receive, from a first communication device of a first subscriber located in the first network region, a request to initiate a voice call to a second communication device of a second subscriber located in the second network region, the request comprising an abbreviated dial string including a directory number associated with the second communication device;

determine that an enterprise network comprising the first and second network regions is in the second operational mode, wherein the second operational mode corresponds to a state where a network failure has occurred and the first subscriber in the first network region is unable to directly dial the second subscriber in the second network region and the second network region is under control of a spare media server;

map, in a dial plan, the abbreviated dial string to a corresponding electronic address for the second communication device, the corresponding electronic address having more digits than the abbreviated dial string and being in a form addressable over the second intermediate network;

use the corresponding electronic address to route the voice call over the second intermediate network to the second communication device, wherein the first intermediate network is a packet switched network, and wherein the second intermediate network is a circuit-switched network; and after the call is routed over the second intermediate network to the second communication device, at least one of the first and second network regions transmitting in-band feature information, wherein the in band feature information is a reason code.

13. The enterprise network of claim 12, wherein the first operational mode is in existence when the common media server is able to communicate with each of the first and second network regions over the first intermediate network, wherein the second operational mode is in existence when the media server is unable to communicate with each of the first and second network regions over the first intermediate network and wherein the corresponding electronic address includes the directory number.

14. The enterprise network of claim 13, wherein the common media server is the primary media server, wherein the second network region comprises the spare media server, wherein, in the second operational mode, the second network region is under the control of the spare media server.

15. The enterprise network of claim 12, wherein the second communication device is a digital station connected to the second gateway, wherein the second communication device is not packet-switched, and wherein the second operational mode is deemed to be in existence when the second gateway is not registered with the common media server.

16. The enterprise network of claim 12, wherein the second communication device is packet-switched, and wherein the second operational mode is deemed to be in existence when the second communication device not registered with the common media server.

17. The enterprise network of claim 12, wherein a first set of trunks in the enterprise network is not local to the second gateway, wherein a second set of trunks in the enterprise network is local to the second gateway, and wherein, when the second operational mode is in effect, the first set of trunks is considered out-of-service for purposes of directing the voice call to the second network region and the second set of trunks is not considered out-of-service for purposes of directing the voice call to the second network region.

18. The enterprise network of claim 14, wherein the dial plan is stored in the primary media and spare media servers.

19. The enterprise network of claim 12, wherein the second communication device is packet-switched and wherein the routing agent:
    determines whether the second subscriber is logged off the second communication device;
    when the routing agent determines that the second subscriber is logged off of the second communication device, deems the first operational mode to be in existence; and
    when the routing agent does not determined that the second subscriber is logged off of the second communication device, deems the second operational mode to be in existence.

20. The enterprise network of claim 12, wherein the other of the at least one of the first and second network regions implements the reason code.

\* \* \* \* \*

UNITED STATES PATENT AND TRADEMARK OFFICE
CERTIFICATE OF CORRECTION

PATENT NO.        : 8,462,637 B1
APPLICATION NO.   : 11/231203
DATED             : June 11, 2013
INVENTOR(S)       : Christopher David Baldwin et al.

Page 1 of 1

It is certified that error appears in the above-identified patent and that said Letters Patent is hereby corrected as shown below:

In the Claims

At column 13, line 9, please delete "and".

At column 13, line 19, please delete the second occurrence of "in band" and replace it with --in-band-- therein.

At column 15, line 4, please delete the second occurrence of "in band" and replace it with --in-band-- therein.

Signed and Sealed this
Twelfth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,462,637 B1  
APPLICATION NO. : 11/231203  
DATED : June 11, 2013  
INVENTOR(S) : Christopher David Baldwin et al.

It is certified that error appears in the above-identified patent and that said Letters Patent is hereby corrected as shown below:

On the title page of the patent, under item (73) Assignee: Please delete "Sheridan Ross P.C." and insert --Avaya Inc.-- therein.

Signed and Sealed this  
Seventeenth Day of December, 2013

Margaret A. Focarino  
*Commissioner for Patents of the United States Patent and Trademark Office*